2 Sheets—Sheet 1.

D. M. HOLMES.
CRACKER-MACHINE.

No. 174,244. Patented Feb. 29, 1876.

WITNESSES:
A. W. Almqvist
John Goethals

INVENTOR:
D. M. Holmes
BY
Munn & Co
ATTORNEYS.

N. PETERS, PHOTO-LITHOGRAPHER, WASHINGTON, D. C.

2 Sheets—Sheet 2.

D. M. HOLMES.
CRACKER-MACHINE.

No. 174,244. Patented Feb. 29, 1876.

WITNESSES:
A. W. Almquist
John Goethals

INVENTOR:
D. M. Holmes
BY
ATTORNEYS.

N. PETERS, PHOTO-LITHOGRAPHER, WASHINGTON, D. C.

UNITED STATES PATENT OFFICE.

DANIEL M. HOLMES, OF NEW YORK, N. Y., ASSIGNOR TO J. CUTLER FULLER, OF ORANGE, NEW JERSEY.

IMPROVEMENT IN CRACKER-MACHINES.

Specification forming part of Letters Patent No. 174,244, dated February 29, 1876; application filed December 27, 1875.

*To all whom it may concern:*

Figure 1:
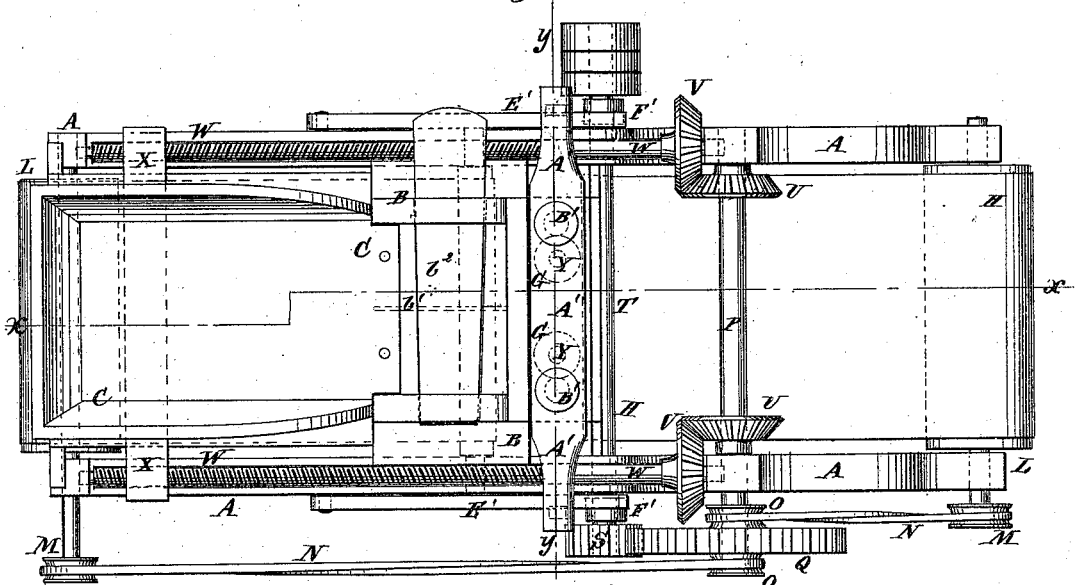
Figure 2:
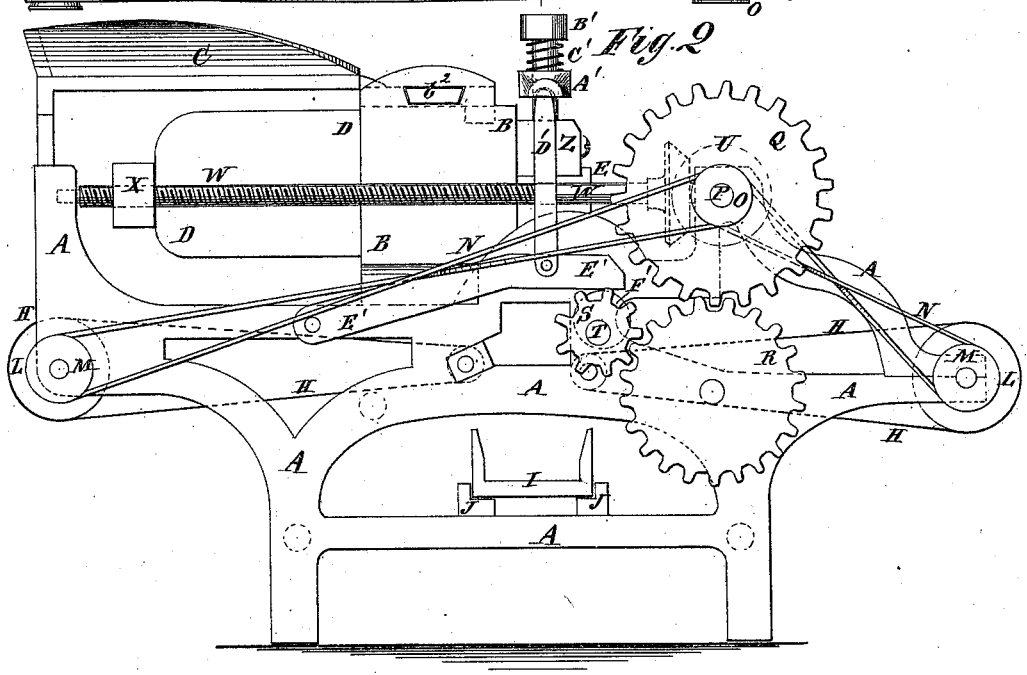
Figure 3:
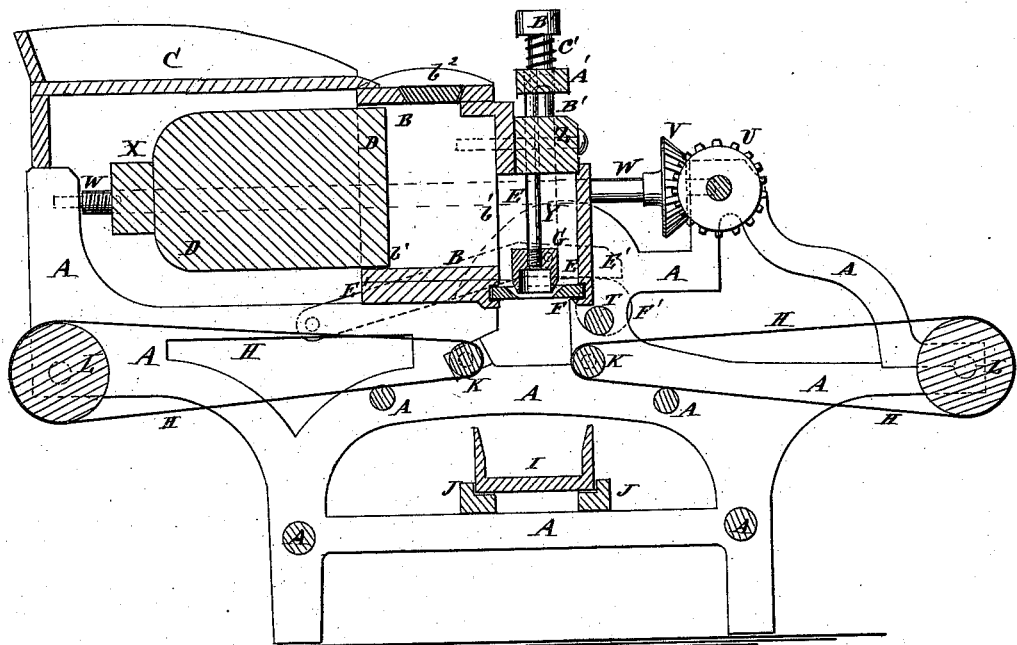
Figure 4:
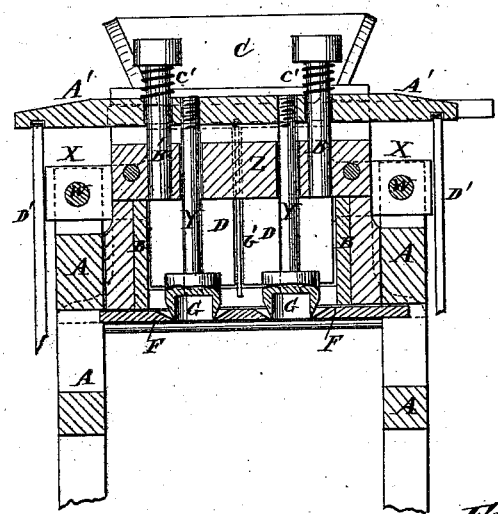
Figure 5:
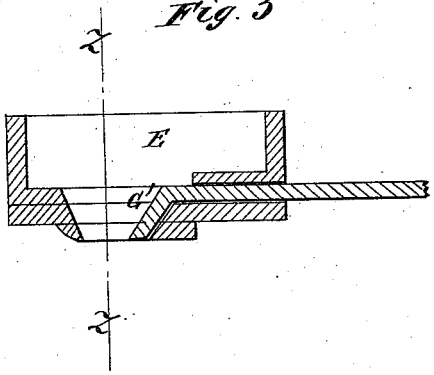
Figure 6:
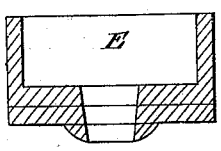

Be it known that I, DANIEL M. HOLMES, of the city, county, and State of New York, have invented a new and useful Improvement in Cake-Machine, of which the following is a specification:

Figure 1, Sheet 1, is a top view of my improved machine. Fig. 2, Sheet 1, is a side view of the same. Fig 3, Sheet 2, is a vertical longitudinal section of the same, taken through the line $x\,x$, Fig. 1. Fig. 4, Sheet 2, is a vertical cross-section of the same, taken through the line $y\,y$, Fig. 1. Fig. 5, Sheet 2, is a detail section of a modification of the same. Fig. 6, Sheet 2, is a detail cross-section taken through the line $z\,z$, Fig. 5.

Similar letters of reference indicate corresponding parts.

The object of this invention is to furnish an improved machine for making cakes, such as jumbles, kisses, drops, macaroons, &c., of dough so soft that heretofore it could be worked only by hand, and which shall be simple in construction and convenient in use.

This machine is for giving form to dough for making cakes, such as jumbles, kisses, drops, macaroons, &c. Heretofore the difficulty experienced in the attempt to construct a suitable machine for this purpose has been the soft and adhesive nature of the dough, so that cakes of the classes named have been almost altogether made by hand.

The construction and arrangement of the several parts of the machine are as follows:

A is the frame of the machine, to the upper middle part of which is attached the dough-box B, into the open top of which the dough is fed from a hopper, C, attached to the rear part of the frame A. The dough-box B is divided into as many compartments as there are discharge-openings by thin vertical partitions $b^1$, and into each compartment is fitted a plunger, D, which enters through the rear side of the said dough-box.

The object of this construction is this: the dough is soft and must be discharged downward. If the plungers worked vertically, they would have to be raised to a considerable distance before the dough could be put into the dough-box, which would cause a great loss of time in working the machine. When the plungers work horizontally the top of the dough-box can be opened and the dough can be put in while the plungers are receding, so that the plungers need be drawn back no farther than to give space for the charge, and hence no time is lost.

The open top of the dough-box B is closed with a sliding cover, $b^2$, to prevent the dough from being pushed out of said open top by the action of the plungers D.

Upon the lower forward side of the dough-box B is formed an extension, E, the bottom of which is at a lower level than the bottom of the main part of the dough-box.

The bottom F of the extension or offset E of the dough-box B slides in and out in grooves in the sides of said extension, so that it can be taken out and exchanged for a plate with larger or smaller openings when desired, and in it are formed one, two, or more round holes, which are beveled off or made conical, as shown in Figs. 3 and 4.

G are the ring-cutters, which are made in the shape of hollow cylinders with closed upper ends, and with the outer sides of their edges beveled off with a longer bevel than the bevel of the holes through the bottom or cutter plates F, so that when the cutters G are forced down their extreme edges may come in contact with the extreme edges of the holes in the cutter-plate F, and separate or pinch off the dough.

The cutters G are never raised entirely out of the holes in the bottom plate F, so that when the dough is pressed down and out by the advance of the plungers D it passes out upon all sides of the cutters G, is pinched off by the descent of the cutters G, and drops as a ring upon the pans placed beneath the bottom plate F upon the endless carriers H, which are placed in line with each other and at a little distance apart.

The object of thus separating the carriers is this: The first cakes dropped from the plate F are incomplete, or not so well formed as those subsequently made, when the pressure of the plunger has compacted the dough. It is, of course, not desired to bake these incompletely-formed cakes, nor that they shall be allowed to drop on the carriers H, and hence they are not received into the baking-pans which travel on the carriers H, but drop between the ends of such carriers into a separate pan, I, which is slid under the machine on rabbeted bars J. The carriers are sufficiently near each other to allow the baking-pans to pass from one onto the other. The carrier-aprons pass around rollers K and L, and the latter are connected with shaft P by belts N, passing around pulleys M and O.

The shaft P revolves in bearings attached to the upper forward part of the frame A.

To the end of the shaft P is attached a large gear-wheel, Q, into the teeth of which mesh the teeth of a large intermediate gear-wheel, R.

The gear-wheel R revolves upon a gudgeon attached to the frame A, and into its teeth mesh the teeth of a small gear-wheel, S, attached to the end of the driving-shaft T, which revolves in bearings attached to the frame A, and to its other end are attached the pulleys to receive the driving-belt.

To the end parts of the shaft P are attached two bevel-gear wheels, U, the teeth of which mesh into the teeth of the bevel-gear wheels V, attached to the forward ends of the screws W, which are swiveled to the frame A, and pass through screw-holes in the end parts of the cross-bar X, attached to the rear ends of the plungers D, so that the said plungers may be forced forward with a steady and uniform movement while the machine is at work.

The cutters G are attached to the lower ends of rods Y, the upper ends of which pass up through the block Z, attached to the dough-box B, in the angle between the upper part of said dough-box and its extension E, and their upper ends are attached to the cross-bar A'.

The cross-bar A' moves up and down upon guide-pins B', attached to the block Z, and is forced down to cause the cutters G to make a cut by the spiral springs C', placed upon the upper parts of the guide-pins B'. The upper ends of the spring C' rest against the heads of the pins B', and their lower ends rest against the cross-bar A'.

The cutter-head Z is detachable, so that it may be detached and exchanged for another with larger or smaller, or with different-shaped, cutters when desired.

The ends of the cross bar A' project and are recessed upon their lower sides to receive the upper ends of the push-bars D', the lower ends of which are pivoted to the levers E' near their forward ends. The rear ends of the levers E' are pivoted to the frame A, and their forward ends rest upon the cams F', formed upon the driving-shaft T, so that the cutters G may be operated at each revolution of the driving-shaft T. The cutters G, as hereinbefore described, are designed for cutting jumbles or other ring cakes.

For cutting kisses, drops, macaroons, and other similar cakes without holes through them, there are used sliding beveled cutters G', pinching off the dough against the beveled side of the discharge-openings in the same manner as the cutters G pinch it off, as shown in Figs. 5 and 6.

Having thus described my invention, I claim as new and desire to secure by Letters Patent—

1. A dough-box, B, made with an extension and offset, E, to receive the cutters and enable them to operate at right angles with the plungers D, substantially as herein shown and described.

2. A dough-box made with its discharge-openings at right angles with the line of motion of the plungers D, that force out the dough, substantially as herein shown and described.

3. A dough-box divided by partitions $b^1$ into two or more compartments, each provided with a discharge-opening and with a plunger, D, substantially as herein shown and described.

4. The combination of the detachable and exchangeable cutter-head Z with the dough-box D and its extension and offset E, substantially as herein shown and described.

5. The combination of the cross-bar A', and its guide-pins B' and springs C', the push-bars D', levers E', and cams F', with the detachable head-blocks Z, the cutters G Y, and the driving-shaft T, substantially as herein shown and described.

6. A cake-machine having the cutters adapted to work within the dough-box, said cutters being surrounded with and embedded in the dough when at work, substantially as herein shown and described.

7. The combination, with a plunger and dough-box, of cutters made with beveled edges and cutter-plates having openings with beveled edges, as shown and described.

8. Two endless carriers in a cake-machine, working in line with each other, and with a space or opening between them beneath the discharge-opening of the dough-box, substantially as herein shown and described

DANIEL M. HOLMES.

Witnesses:
JAMES T. GRAHAM,
ALEX. F. ROBERTS.